June 8, 1954   B. E. GOLDMAN ET AL   2,680,804
ADJUSTABLE AUTOMOBILE HEADLIGHT RIM
Filed Oct. 15, 1953
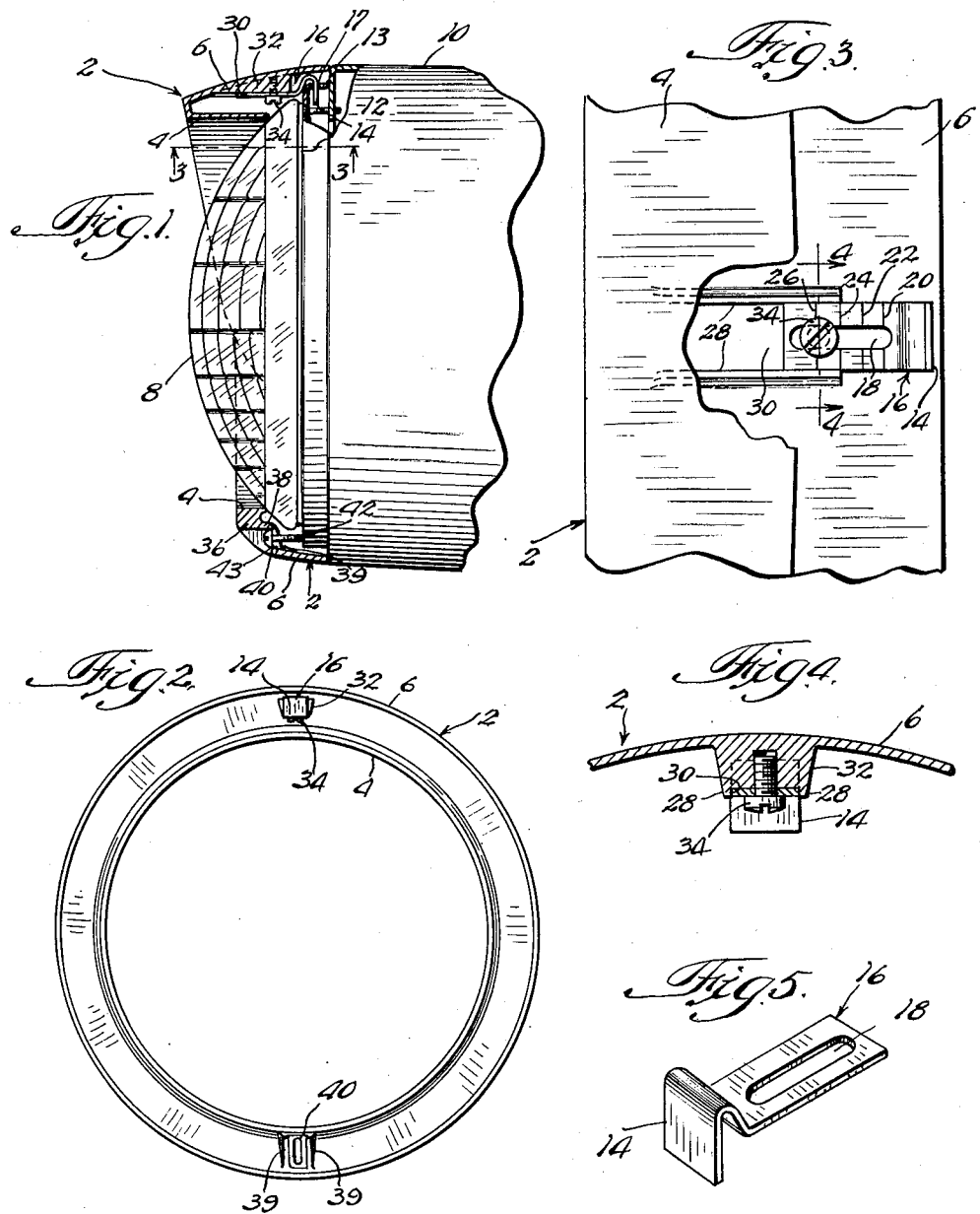
INVENTORS.
Ben E. Goldman,
BY & Morris Goldman.
B. Gordon Allen Patented June 8, 1954

2,680,804

UNITED STATES PATENT OFFICE 2,680,804

ADJUSTABLE AUTOMOBILE HEADLIGHT RIM

Ben E. Goldman and Morris Goldman, Chicago, Ill.

Application October 15, 1953, Serial No. 386,219

3 Claims. (Cl. 240—7.1)

1

This invention relates to automobile headlamp rims and more particularly to a rim which may be adjusted to accommodate the fender design of various automobiles.

According to prior art practice, a headlamp rim would fit only a few of the various fender designs, thereby requiring a dealer to maintain a very large stock of rims to accommodate the various automobiles in widespread service. In an effort to overcome this problem, deformable clips have been used to mount headlamps on various types of fenders; however, such clips not only tend to break but also require skill and judgment on the part of a mechanic who applies the headlamp rim to a fender.

A primary object of the present invention is to devise a headlamp rim with an adjustable clip which may be quickly and easily adjusted to accommodate a great many designs of fenders.

Another object of the invention is to provide convenient and simple index means to selectively position the clip in various adjusted positions thereof so that an unskilled mechanic may adjust the clip to the desired fender design in accordance with oral or written instructions.

Still another object of the invention is to devise a radially enlongated slot in the rim diametrically opposed to the clip and adapted to accommodate a retainer, such as a screw associated with any fender to which the clip is adjusted.

A more specific object of the invention is to devise novel clamp means for the clip which are readily accessible and which do not require slotting or other weakening of the rim structure.

Yet another object of the invention is to devise a novel rim such as above described wherein the rim structure is not only economical to manufacture but is unusually rugged to withstand the rigors of automotive service.

The foregoing and other objects of the invention will become apparent from a consideration of the following specification and accompanying drawing, wherein:

Figure 1 is a central vertical sectional view of a headlamp rim embodying the invention and applied to a conventional automobile fender and headlamp, which are shown in elevation;

Fig. 2 is a rear elevational view of the rim shown in Fig. 1;

Fig. 3 is an enlarged fragmentary view of the rim taken on line 3—3 of Fig. 1, with a portion of the rim's inner web broken away;

Fig. 4 is a sectional view on line 4—4 of Fig. 3; and

Fig. 5 is a perspective view of the clip.

2

Describing the invention in detail, the novel headlamp rim 2 comprises spaced radially inner and outer webs or walls 4 and 6 projecting axially of the rim, the inner web 4 being adapted to retain a headlamp 8 on a front fender 10 of a conventional automotive vehicle.

The radially outer wall 6 is adapted to mate with fender 10, to afford a sealed enclosure around the inner or rear edge of the headlamp 8, and said outer wall 6 also affords a convenient enclosure for a flange 12 of the fender 10, against which flange the inner or rear edge of the headlamp body 13 is seated in the usual manner.

The headlamp body 13 is slotted as at 17 to receive a hook 14 of a clip 16 having an elongated slot 18 and having index marks in the form of lines 20, 22, 24 and 26 interrupted by said slot 18 for a purpose hereinafter described.

The clip 16 is adjustably movable lengthwise thereof between spaced guide ribs 28 which define a guideway or groove 30 in a boss 32 integrally formed on the radially inner perimeter of wall 6 and spaced from the radially outer perimeter of wall 4, to accommodate lengthwise movement of the clip 16 during adjustment thereof, as hereinafter described.

It may be noted that boss 32 extends axially rearwardly of the radially inner wall 4 to afford access to a clamping screw 34 threaded into said boss 32 and extending through the slot 18 of clip 16. By means of this novel arrangement, the screw 34 may be conveniently engaged by a suitable tool (not shown) without the necessity of providing a slot in the radially inner wall 4 to afford access to the screw 34 for this purpose. Thus it will be understood that the novel arrangement not only accommodates adjustment of clip 18 but also affords an unusually sturdy and economical structure.

At the bottom of the rim 2 the inner web 4 is radially thickened to define a lug or rib 36 which is beveled along its axially inner edge to define an upwardly facing surface as at 38 affording clearance for the headlamp 8. The axially inner edge of rib 36 is connected to a pair of vertical ribs 39 extending lengthwise thereof radially of the rim 2 to define a radial slot 40 for the reception of a retainer screw 42 threaded into a complementary hole (not shown) of the headlamp body 13, which is conventional in this regard. The slot 40, as best seen in Fig. 2, is diametrically opposite the clip 16.

The head of screw 42 seats against substantially vertical surfaces 43 of the ribs 39 along the forward or axially outer edges thereof, said surfaces 43 being approximately normal to the axis of the rim, as best seen in Fig. 1. The ribs 39 taper upwardly or radially inwardly toward their junction with rib 36, and the radially outer or lower ends of the ribs 39 merge with the radially outer web 6, as shown in Figs. 1 and 2. Thus it will be understood that the novel arrangement of ribs defining the slot 40 affords an economical and sturdy construction accommodating easy assembly and disassembly of the headlamp 8 and rim 2.

Referring now to Figs. 3 and 5, it will be noted that the index lines 20, 22, 24 and 26 are spaced lengthwise of the clip 16 and the elongated slot 18 therein, and said lines are plainly visible at the sides of said slot. In the illustrated embodiment of the invention, when clip 16 is anchored to rim 2 by screw 34 with the head of said screw between lines 20 and 22, the headlamp rim 2 may be assembled with any "Oldsmobile," 1940–48. When the clip is anchored with the head of screw 39 between lines 22 and 24, the rim 2 may be assembled with any of the following automobiles: "Buick" 1949–52; "Chevrolet" 1949–52; "Dodge" 1946–53; "Plymouth" 1949–53; "Chrysler" 1949–50; "De Soto" 1949–53; and "Willys Aero" 1952–53. When the clip is anchored with the head of screw 34 between lines 24 and 26, the rim 2 may be assembled with any of the following automobiles: "Packard" 1951–53; "Kaiser" 1946–52; "Frazer" 1946–50; and "Henry J" 1950–53.

In assembling the novel rim 2, the clip is clamped by screw 34 in the desired position, depending upon the design of automobile. The hook 14 is then inserted in the slot of the headlamp body 13, whereupon the rim is rotated to the position shown in Fig. 1. The screw 42 is then applied, to hold the rim 2 tightly in its assembled position.

An important feature of the invention is that in the event the slot 17 in the headlamp body is damaged or distorted the hook 14 may be inserted between the fender flange 12 and the headlamp body 13 and the clip 16 adjusted so that when the screw 34 is tightened, the outer wall 6 of the headlamp rim 2 mates perfectly with the front fender 10.

Another important feature of the invention resides in the manner in which slot 40 is elongated radially of the rim to accommodate assembly thereof, with the clip in the various adjusted positions above-described. In this connection it will be understood that adjustment of the clip changes the distance between slot 40 and the rotational axis of the rim during assembly thereof, and this change is accommodated by elongation of the slot 40.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicate in the hereinafter appended claims.

What is claimed as new and desired to be secured by Letters Patent of the United States is as follows:

1. A universal headlamp rim for attachment to any of several rimlike mountings which mountings comprise a substantially cylindrical portion and a flange forming a shoulder with said portion, said portion being provided with an opening adjacent to said shoulder, the axial spacing between said opening and said shoulder being varied as between different mountings, said rim comprising a web, a clip arranged for axial adjustable movement mounted on said web to accommodate for said varied axial spacings, said clip having a part for engagement in said opening to retain a margin of said headlamp rim juxtaposed to said shoulder, means for securing said clip in a selected adjusted position, and means for uniting said rim and the mounting at some other point circumferentially spaced from said clip, the uniting means including a radially elongated aperture in said rim for the reception of a uniting member, said aperture being adapted to accommodate for varying adjustments of said clip in providing proper connection of said uniting member with a relatively fixed screw-threaded element in said mounting.

2. A universal headlamp rim for attachment to any of several rimlike mountings which mountings comprise a substantially cylindrical portion and a flange forming a shoulder with said portion, said portion being provided with an opening adjacent to said shoulder, the axial spacing between said opening and said shoulder being varied as between different mountings, said rim comprising inner and outer webs spaced from each other, a boss on the radially inner periphery of said outer web, said boss being spaced from the inner web and extending axially of said rim to a point rearwardly of said inner web, a clip arranged for axial adjustable movement mounted on said boss to accommodate for said varied axial spacing, the clip being provided with a radially directed hook portion for engagement in said opening to retain a margin of said headlamp rim juxtaposed to said shoulder and with said clip also having an axially-extending longitudinal slot therein, a screw in said slot and threaded into said boss to secure said clip in predetermined selected position, and means on said headlamp rim for uniting said rim to said mounting, said means comprising a radially elongated aperture being formed so that it may afford proper connection of a uniting member with a complementary relatively fixed screw-threaded element in said mounting to firmly unite said rim to said mounting in any adjustment of said clip.

3. The combination in accordance with claim 2 wherein the boss is provided with spaced guide ribs defining a groove for said clip and said elongated aperture is positioned diametrically opposite said boss.

References Cited in the file of this patent

UNITED STATES PATENTS

| Number | Name | Date |
| --- | --- | --- |
| 1,167,824 | Hunt | Jan. 11, 1916 |
| 1,614,728 | Godley | Jan. 18, 1927 |
| 1,726,837 | Jording | Sept. 3, 1929 |
| 1,855,889 | Nielsen | Apr. 26, 1932 |
| 2,089,424 | Punke | Aug. 10, 1937 |

FOREIGN PATENTS

| Number | Country | Date |
| --- | --- | --- |
| 299,011 | Germany | May 31, 1919 |